Aug. 30, 1966   H. M. BRAMBERRY   3,269,739
PISTON RING CONSTRUCTION
Filed July 1, 1963   2 Sheets-Sheet 1

INVENTOR.
HARRY M. BRAMBERRY
BY
Georges A. Truswell

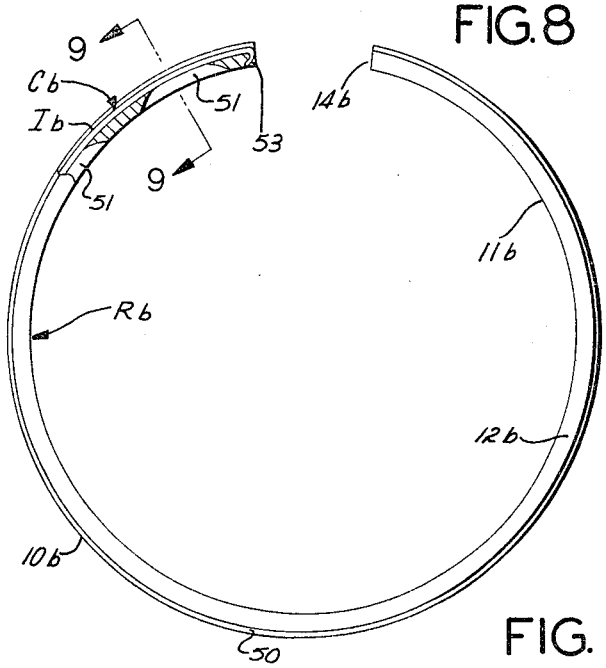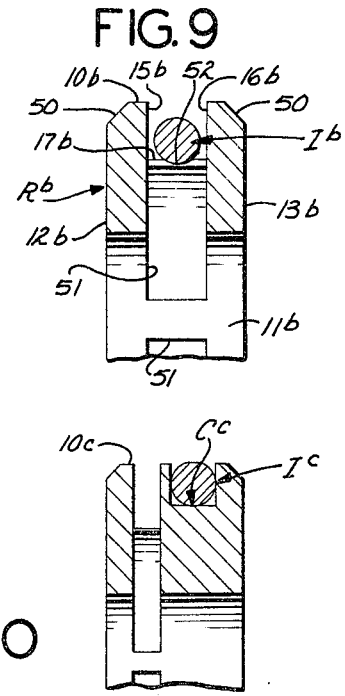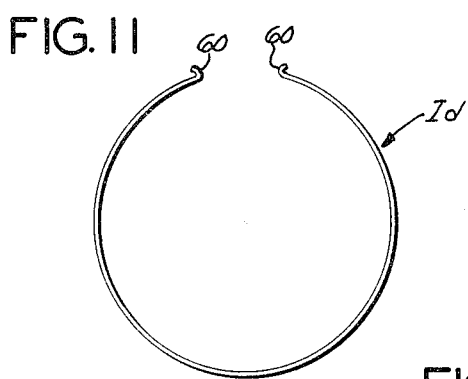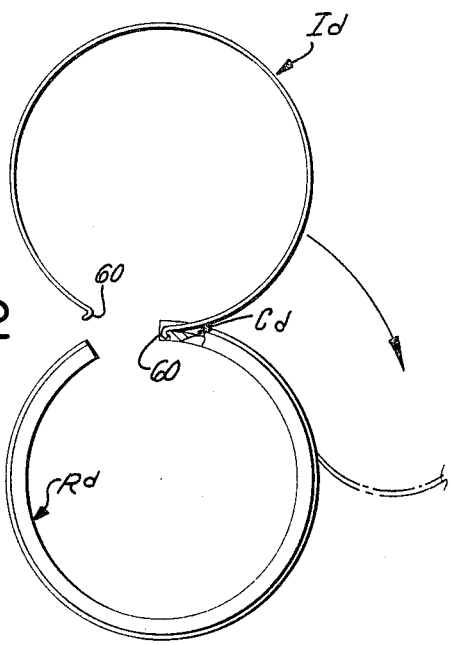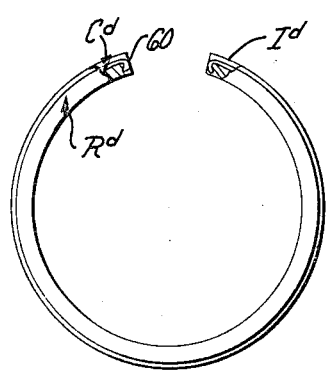

United States Patent Office 3,269,739
Patented August 30, 1966

3,269,739
PISTON RING CONSTRUCTION
Harry M. Bramberry, Northridge, Calif.
(241 N. Westmoreland Ave., Los Angeles, Calif.)
Filed July 1, 1963, Ser. No. 291,829
3 Claims. (Cl. 277—151)

This invention relates to a novel piston ring construction for internal combustion engines.

In the art of internal combustion engines, that is, in engines wherein pistons are reciprocated in cylinders, the pistons are provided with annular grooves in which split rings are arranged, which rings are adapted to engage and seal on the walls of the cylinder bore in which the pistons operate.

There are two basic types of piston rings used in connection with pistons in reciprocating internal combustion engines. The first type of rings are simple imperforate rings adapted to establish a desired sealed relationship between the pistons and their related cylinders, and commonly referred to as compression rings. The second type of rings are perforate or grooved and ported rings adapted to carry and deposit lubricant on the walls of the cylinders and are commonly referred to as "oil" rings.

This invention relates to novel compression ring and oil ring constructions, as will hereinafter be described.

Throughout the many years of development in the piston ring art, it has been determined that rings made of cast iron are most satisfactory. In addition to other advantages, cast iron is substantially inert to the conditions encountered in combustion zones in internal combustion engines, is hard, and is not subject to wearing at an excessive rate, and, finally, due to the graphite content in cast iron, it has certain self-lubricating qualities which make it particularly suitable for piston ring constructions.

The ordinary piston ring, be it a compression ring or an oil ring, fits loosely, radially in a piston ring groove in which it is engaged, and establishes yielding pressure engagement on the wall of the cylinder bore in which it is engaged. To achieve this relationship, the ordinary cast iron piston ring is split and is established in an open, out of round form, in which a free gap occurs between the ends of the rings and such that when it is compressed and arranged in a cylinder bore of predetermined diameter, the free gap is substantially closed and the ring is round, establishing uniform pressure bearing and sealing engagement on the cylinder bore wall.

The pressure engagement of the ring on the cylinder bore wall is achieved by or through the resiliency of the cast iron and by compressing or springing it into engagement in the cylinder bore.

Due to the relatively fixed and limited modulus of elasticity of cast iron, when properly established to impart into it the most advantageous characteristics for the establishment of piston rings, and due to the tolerances and configurations for piston rings established and made standard by the art, the pressure engagement that can be established by cast iron piston rings is limited and often considerably less than is desired. For example, an ordinary or conventional cast iron compression ring for a modern, high-compression automobile engine, four inches in diameter, establishes approximately eight pounds per square inch on the wall of the cylinder in which it is engaged, whereas, it would be advantageous and desirable that such a ring established from ten to twelve pounds on the opposing cylinder.

In efforts to increase the pressure at which a piston ring engages the wall of its related cylinder bore, the prior art has provided rings of special alloys forfeiting the advantages of cast iron, or has provided special spring type expansion rings and means, engageable in a piston ring groove, radially inwardly of the piston ring and adapted to supplement the natural resiliency of the ring and, in part, increase pressure on the cylinder bore by expanding the ring from within.

Such devices are costly and complicated to manufacture and/or install, and leave much to be desired.

While cast iron, as pointed out above, has several advantageous characteristics for the establishment of piston rings, it also has certain disadvantages. Cast iron rings with the desired graphite content and the desired hardness, so that rings established thereof will properly wear and establish the desired seal with the walls of the cylinder bores in which they are engaged, and without scoring and damaging the cylinder bore walls, while having reasonably good wearing characteristics, nevertheless do not have as good wearing characteristics as many other metals, such as molybdenum.

The prior art has endeavored to overcome the relatively poor wearing characteristcs of cast iron piston rings, or to enhance their wearing ability by depositing coatings of metals such as chromium or molybdenum on the wearing and/or sealing surfaces of the rings. While this does increase the wearing life of the rings, it prevents the cast iron from establishing the superior seal which it is particularly adapted to establish, and requires the employment of costly and complicated manufacturing methods and/or procedures.

In practice, the ordinary cast iron piston ring provides excessive sealing surface for the establishment of the desired or sought-after seal with the wall of the cylinder bore in which it is related.

The present invention has two basic, related objects. The first object is to enhance or increase the wearing characteristics of cast iron piston rings and the second is to provide cast iron piston rings having increased resiliency and the resulting capacity to establish greater pressure sealing and/or bearing engagement on the wall of a cylinder bore.

Another object of this invention is to provide a cast iron piston ring construction with a metallic insert engaged in a channel in the outer wearing and sealing surface of the ring.

It is an object of this invention to provide a structure of the character referred to wherein the insert is established of a metal having greater wearing ability than the cast iron of which the ring is established, and establishes wear-receiving engagement on a related cylinder bore wall between the adjacent portions of the sealing surface of the cast iron ring.

It is a further object of this invention to provide a ring construction of the general character referred to wherein the insert occurs radially outward of the central or mesne diameter of the ring, is established of a metal having a higher tensile strength and a higher modulus of elasticity than the cast iron ring, and is engaged in fixed position in the ring when the ring is unstressed, so that when the ring is stressed and compressed into engagement in a cylinder bore, the insert is tensioned and stressed and serves to yieldingly urge the ring to its unstressed condition or position, thereby increasing the pressure engagement of the ring in the cylinder bore in which it is arranged.

Still another object of the present invention is to provide a structure of the character referred to wherein the cast iron ring is pre-stressed by the insert and before it is engaged in the cylinder bore; that is, the ring is stressed by establishing a larger than normal free gap, accomplished by intentionally spreading the gap ends and then putting them in the insert to maintain the abnormal free gap.

An object of this invention is to provide a method of manufacturing a pre-stressed cast iron piston ring of the character referred to which includes pre-stressing the insert before it is engaged with the ring.

Another object is to provide a novel method of manufacturing a pre-stressed piston ring of the character referred to which includes stressing the ring by opening the free gap thereof before and during engagement of the insert therein.

It is an object of this invention to provide a structure of the character referred to wherein the insert can be arranged in the ring clear of the cylinder bore and to stress the ring only; to engage a cylinder bore and receive wear, but not stress the ring; or, to both engage the cylinder bore to receive wear and to stress the ring.

An object of this invention is to provide a structure of the character referred to wherein the insert can be retained in the insert-receiving channel in the ring by means of a press fit; by means of a suitable resin; by brazing, or the like; by mechanical locking and/or gripping means, or by other suitable or desired means.

Another object of this invention is to provide a novel piston ring construction which is such that it can be established or manufactured easily, quickly and economically by simple and easy methods of manufacture, which require a minimum of tooling and special machining or grinding, and which are economical of both time and material.

The various objects and features of this invention will be fully understood from the following detailed description of typical preferred forms and applications of my invention, throughout which description reference is made to the accompanying drawings, in which:

FIG. 8 is a view similar to FIG. 1 showing the present invention incorporated in an oil ring construction;

FIG. 9 is an enlarged detailed sectional view taken as indicated by line 9—9 on FIG. 8;

FIG. 10 is a view similar to FIG. 9 and showing another form of oil ring construction embodying the present invention;

FIGS. 11, 12 and 13 are views showing certain of the steps in carrying out one of the methods of manufacturing my new piston ring construction.

Figure 1:
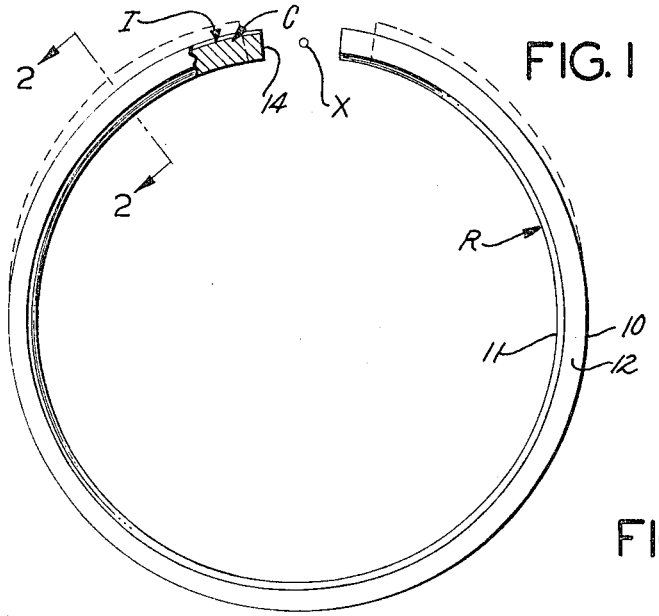
FIG. 1 is an elevational view of a piston ring construction embodying one form of my invention, there being a portion broken away to better illustrate the construction.
Figure 2:
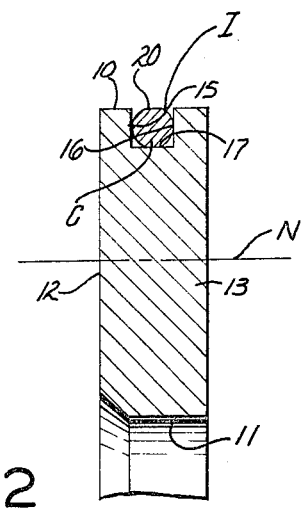
FIG. 2 is an enlarged detailed sectional view taken as indicated by line 2—2 on FIG. 1, showing the insert press-fitted into the groove in the ring.

The piston ring R shown in FIGS. 1 and 2 of the drawings is similar to a conventional cast iron piston ring and has a flat radially outwardly disposed sealing surface 10, a radially inwardly disposed inner surface 11, a flat axially upwardly disposed top surface 12 and a flat axially downwardly disposed bottom surface 13. The ring R is split, defining ends 14, which ends are parted or spaced to define a free gap X.

In addition to the foregoing and in accordance with the present invention, the outer sealing surface 10 is provided with a central, circumferentially extending, radially outwardly opening channel C having flat, radially extending and axially disposed top and bottom walls 15 and 16, and a flat, radially outwardly disposed inner wall or bottom 17.

In accordance with conventional methods of manufacturing cast iron piston rings, the ring R may be established from a split ring blank, which blank is cut from cylindrical cast iron sleeve or tube stock, which stock has been split longitudinally, sprung or biased open along said split and heat-treated to anneal the iron and to set it in its open condition; or, it may be established from a unitary, out-of-round cast blank, having a section thereof removed to establish a free gap.

The inner, top and bottom surfaces 11, 12 and 13 are dressed by a suitable grinding and/or honing operation, in accordance with conventional manufacturing procedures, and the channel C is established in the outer portion of the ring by a suitable cutting or grinding operation.

The outer sealing surface 10 of the ring R can be dressed by a suitable turning or grinding operation before the establishment of the channel C therein, or it can be dressed simultaneously with the establishment of the channel or at a subsequent time, as will hereinafter be described.

In addition to the foregoing, and in accordance with the present invention, the present ring R is further provided with an insert I in the channel C. The insert I is a simple link of high tensile, wear-resistant metal wire, having a high resistance to wear. The insert is of suitable cross-section and is press-fitted into the channel C. The insert I substantially occupies the channel C and is co-extensive therewith.

In practice, it is preferred that the channel C be greater in lateral extent than in radial extent or depth, and that the insert stock or wire be round in cross-section, be equal in diametric extent with the lateral or axial extent of the channel and be greater in diametric extent than the radial extent or depth of the channel, whereby the insert stock initially slidably engages the top and bottom walls 16 and 17 of the channel, and has a portion projecting radially outwardly from the channel when it is initially fully engaged therein and seated on the inner wall 17 of the channel.

Further, it is preferred that the insert stock be suitably prepared or annealed so that it can be flowed into the channel C by the application of suitable pressure.

The insert I is urged into snug engagement in the channel by hand or by suitable machine operation and is subsequently rolled, drawn and compacted into tight pressure and frictional engagement in the channel by first engaging the outwardly projecting portion of the insert at one end thereof, with a roller or other suitable tool, then exerting sufficient pressure to cause the stock from which the insert is established to flow into the channel C a desired extent and then urging the roller or tool circumferentially of the ring and along the remainder of the insert stock, thereby flowing, compacting and drawing the insert into tight engagement in the channel.

The flowing, compacting and drawing of the insert work-hardens the stock and provides it with the desired wearing characteristics.

By following the above procedure, readily workable and easy to handle raw insert stock can be advantageously employed, which stock when fully engaged in the ring and worked upon, so as to work harden it, is extremely hard and such that it could not have been advantageously handled and engaged in the ring if it were originally so hard.

The amount or extent to which the insert stock is worked and hardened is controlled by the hardness of the raw stock and the diameter or cross-sectional extent of the stock and the relationship of these two factors with a cross-sectional area of the channel C. By properly controlling these three known factors, the desired resulting hardness of the insert and the character or nature of the fit established by the insert in the channel C can be advantageously controlled.

When flowed and worked upon in the manner set forth above, a flat radially outwardly disposed cylinder wall-engaging wearing surface 20 is established on the insert, which surface is flush with the portions of the sealing surface 10 of the ring occurring adjacent each side of the channel C.

If the outer sealing surface 10 of the ring is dressed before the insert is engaged therewith, the ring R is completed upon engagement of the insert therewith.

If, however, the outer sealing surface 10 of the ring has not been dressed, or if it is desired to further dress the wearing surface 20 of the insert, the said surfaces are next ground, turned, and/or dressed in accordance with any suitable conventional grinding and/or dressing procedure.

For the purpose of illustration, I have not shown the insert as completely filling or occupying the channel C. In practice, it is desirable that the insert completely occupy the channel, or occupy it to a greater extent than is illustrated in the drawings.

Further, in practice, the channel is preferably machined so that the walls thereof are rough so that when the insert is flowed and urged into engagement therein, a purchase or interlocking engagement is established between the insert and the walls of the channel.

It will be apparent from the foregoing that the ring R is a unitary structure providing a central, hard, wear-receiving surface 20, and relatively soft, cast-iron sealing surfaces 10 adjacent each side of the wearing surface, which surfaces are adapted to engage and seal on the wall of the cylinder bore in which the ring is engaged.

From a study of the drawings it will be noted that the insert occurs radially outwardly of the normal or central axis of the ring, said normal or central axis being indicated by the broken line N in FIG. 2 of the drawings.

As a result of the above relationship of parts, it will be apparent that when the ring R is compressed so as to close the free gap X, the insert I is drawn and tensioned. The insert I has greater tensile strength and greater elasticity than does the cast iron. Accordingly, when the ring R is compressed circumferentially so as to close the free gap X, in the manner set forth above, the insert in and about the outer peripheral portion of the ring and outward of the central axis thereof, is tensioned and stressed. The insert thus stressed and tensioned, tends to urge the ring open. The cumulative effect of a stressed ring and insert to open, serves to urge the ring into greater pressure sealing and bearing engagement on the related cylinder bore wall with which the ring is related, than can be obtained by a simple, plain, cast iron piston ring construction.

The press fit of the insert in the channel C in the ring is sufficient to prevent slippage of the insert relative to the ring when the assembly is stressed in a manner as set forth above.

In another embodiment of the invention, the ring R is reverse-stressed, that is, the ring is sprung open so that the free gap X is increased, in the manner illustrated in dotted lines in FIG. 1 of the drawings. The ring is stressed in a reversed manner, as set forth above, when the insert I is engaged in the channel C. By so stressing the ring during assembly, the insert I is pre-stressed in the finished product so that when the assembly is stressed and urged into engagement in a cylinder bore, greater and increased pressure bearing engagement is established on the wall of the cylinder bore.

Figure 3:
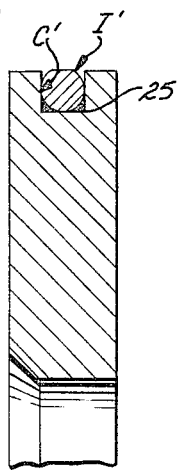
FIG. 3 is a view similar to FIG. 2 showing the insert bonded in the groove in the ring.

In the form of the invention shown in FIG. 3 of the drawings, the insert I' is established of raw insert stock which is of the desired hardness for the finished ring construction. In this form of the invention, the insert I' is inserted into the channel C' when the ring is unstressed or is provided with a reverse stress, to establish a snug fit therein, and is cemented or bonded in fixed position in the channel by suitable resin cement, by a suitable brazing operation, or the like.

In FIG. 3 of the drawings, I have indicated a body or deposit 25 of bonding material in the channel C', at the inner portion thereof and in contact with the insert.

Figure 4:
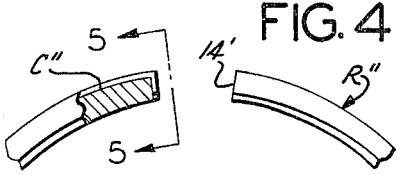
FIG. 4 is a view similar to a portion of FIG. 1 and showing the ends of the insert in hooked engagement with the ends of the ring.
Figure 5:
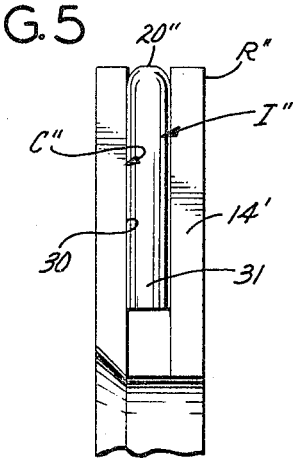
FIG. 5 is a view taken as indicated by line 5—5 on FIG. 1.

In the form of the invention illustrated in FIGS. 4 and 5 of the drawings, the channel C'' is extended radially inwardly across the ends 14'' of the ring R'' as indicated at 30. The insert I'' is urged into snug engagement in the channel C'' in the same manner set forth above, when the ring is unstressed or is reversely stressed, and is provided with extended end portions 31 which end portions are bent radially inwardly into the extensions of the channel C: and establish hooked engagement with the opposing ends of the ring.

In this form of the invention, the flat bearing surface 20'' is established on the insert by subsequent grinding, or the insert can be left to project from the channel a limited predetermined extent so that a flat bearing surface is established by lapping and/or wearing on a cylinder wall after the ring is engaged in a cylinder bore and during the initial break-in period.

Figure 7:
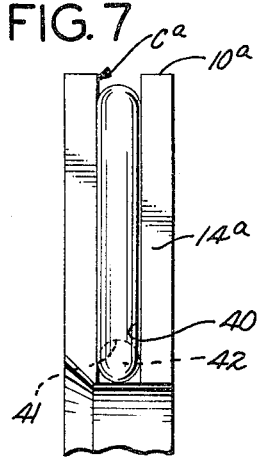
FIG. 7 is a view taken as indicated by line 7—7 on FIG. 6.
Figure 6:
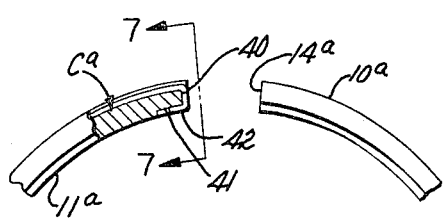
FIG. 6 is a view similar to FIG. 4 and shows another form of the invention, with the insert spaced and clear of the sealing surface of the ring.

In the form of the invention illustrated in FIGS. 6 and 7 of the drawngs, the channel $C^a$ is extended radially inwardly across the ends $14^a$ of the ring $R^a$, as at 40, and thence, for a limited extent, along the adjacent end portions of the inner surface $11^a$ of the ring, as indicated at 41. The insert $I^a$ is urged into snug engagement in the channel $C^a$ in the same manner as set forth above, when the ring is unstressed or is reversely stressed, and is provided with end portions or extensions 42 which are bent radially inwardly and then circumferentially in the extensions 40 and 41 of the channel and to establish hooked engagement with the opposing end portions of the ring.

Further, in the last form of the invention, the channel $C^a$ is deeper or of greater radial extent than the diametric extent of the insert so that the insert is clear of and spaced radially inward of the surface or surfaces $10^a$ of the ring. With this relationship of parts, the insert $I^a$ serves only to stress or pre-stress the ring and is not a wear-receiving part.

In FIGS. 8 through 10 of the drawings I have illustrated oil rings embodying the present invention. In the form of the invention shown in FIGS. 8 and 9 of the drawings, the ring $R^b$ has surfaces $10^b$, $11^b$, $12^b$ and $13^b$, and has ends $14^b$ similar to the surfaces and ends of the previously considered compression rings. The ring $R^b$ also has a channel $C^b$ which, as in the form of the invention shown in FIGS. 6 and 7 of the drawings, extends around the ends $14^b$ and along the inner surface $11^b$ of the ring, a limited distance.

In addition to the foregoing, the ring $R^b$ is chamfered as at 50, about its outer peripheral edges, and is provided with a plurality of oil-conducting ports or apertures 51 extending radially between the inner surface $11^b$ and the inner wall or bottom $17^b$ of the channel $C^b$.

To this extent, the ring $R^b$ is a conventional cast-iron oil ring.

In accordance with the present invention, the ring $R^b$ is further provided with a radially outwardly opening annular seat 52 in the inner wall $17^b$ of the channel $C^b$ intermediate the top and bottom walls $15^b$ and $16^b$ thereof, and is provided with an insert $I^b$, which insert is smaller in diametric extent than the axial and radial extent of the channel, and is engaged in the seat 52, clear of the walls $15^b$ and $16^b$, and radially inward of the sealing surfaces $10^b$.

The insert $I^b$ is provided with extensions 53 at each end which are drawn and bent around the ends of the ring, in the extensions of the channel and/or the seat established in the channel, to establish hooked engagement with the ends of the ring. The insert $I^b$ can be engaged with the ring so that the ring is normally unstressed, or normally pre-stressed in the same manner as set forth above in considering the compression ring construction.

It will be apparent that the insert $I^b$ serves to urge the ring $R^b$ open and into pressure engagement with a related cylinder bore wall, when the ring is engaged in a cylinder bore, but is not such that it will materially interfere with or adversely affect the proper operation of the oil ring.

In the forms of the invention shown in FIGS. 6 through 9 of the drawings, where the insert is not a wearing member or part, but is only a tensioning or stressing member, a material which is suitable for tensioning, but which may not be suitable for establishment of a wear-receiving part, can be used for the insert.

In FIG. 10 of the drawings another form of oil ring embodying the present invention is illustrated. In this form of the invention, the oil ring $R^c$ has similar surfaces, ends and ports or apertures as does the ring construction shown in FIGS. 8 and 9 of the drawings. The various parts and/or portions of this construction are designated by the same characters and/or numbers as are applied to like parts and/or portions of the structure shown in FIGS. 8 and 9 of the drawings.

In this last form of the invention a second insert-receiving channel $C^c$, similar to the channels provided in the compression ring construction is provided. The channel $C^c$ is in the outer surface $10^c$ of the ring, spaced axially to one side of the channel $C^b$, which is a simple oil channel.

An insert $I^c$ is engaged in the channel $C^c$ to serve as a wear-receiving member and/or a tensioning member, as desired or as circumstances require. The insert $I^c$ can be engaged in the channel $C^c$ in any one of the several manners set forth above.

In FIGS. 11 through 13 of the drawings I have illustrated another method which can be employed to assemble an insert and ring, in accordance with the present invention, and so that the resulting ring construction is pre-stressed.

In this carrying out of the invention, the insert $I^d$ is initially bent or formed in a reverse loop or circle and is provided with radially outwardly and circumferentially recurved ring-end-engaging hooks 60 at its opposite ends (see FIG. 11).

The insert $I^d$ thus formed is arranged with its outer periphery adjacent the outer periphery of the ring $R^d$ and with one hook 60 engaged about one end of the ring, as clearly illustrated in FIG. 12 of the drawings. The ring and insert thus partially engaged, the insert is then yieldingly sprung back or on itself and about the outer periphery of the ring and into the channel $C^d$. Finally, the other hook 60, at the opposite end of the insert, is engaged about and hooked with the other end of the ring.

With the above method and relationship of parts, it will be apparent that the resulting ring structure is pre-stressed and that the insert normally biases and yieldingly urges the ring open, before the ring itself is compacted or compressed and stressed in the cylinder bore with which it is related.

In practice, the insert can be made of any desired and suitable material. From experiment and practice, molybdenum has proved to be a suitable material to establish inserts for the structures provided by the present invention. Molybdenum has all of the properties and characteristics that are desired and is adapted to be worked and formed in the necessary and/or desired manner to practice this invention. While this particular material is satisfactory, it is recognized and it is to be understood that in practice other materials may be used with equal or possibly with greater success in certain special circumstances and under particular conditions.

Having described only typical preferred forms and applications of my invention, I do not wish to be limited or restricted to the specific details herein set forth, but wish to reserve to myself any modifications or variations that may appear to those skilled in the art and fall within the scope of the following claims.

Having described my invention, I claim:

1. A cast-iron piston ring with flat axially disposed top and bottom surfaces, a radially inwardly disposed inner surface and a radially outwardly disposed outer sealing surface, said ring being split to define opposing ends and normally set out of round and with its ends in spaced relationship and defining a free gap, said ring having a radially outwardly opening channel in its outer surface intermediate the sides thereof, a wear receiving insert co-extensive with and fixed in the channel, said insert having a flat radially outwardly disposed wear receiving surface flush with said sealing surface, said insert occurring radially outward of the central cross-sectional axis of the ring whereby said insert is tensioned when the ring is compressed to close the free gap and serves to yieldingly urge the ring open towards its set position, said insert being established of molybdenum wire stock having greater tensile strength and elasticity than cast iron.

2. A structure as set forth in claim 1 wherein said insert is press fitted into the channel and is held fixed in said channel throughout its longitudinal extent.

3. A structure as set forth in claim 1 wherein said insert is cold-flowed, compacted and drawn into tight gripping and tensioned engagement in the channel to establish tight locked engagement with the ring throughout its longitudinal extent and to normally yieldingly bias the ring open.

References Cited by the Examiner

UNITED STATES PATENTS

| | | | |
|---|---|---|---|
| 2,212,042 | 8/1940 | Phillips et al. | 277—223 X |
| 2,266,692 | 12/1941 | Olson | 277—223 |
| 2,297,113 | 9/1942 | Phillips | 277—223 |
| 2,398,364 | 4/1946 | Elfstrom | 29—149.5 |
| 2,536,821 | 1/1951 | Rappl | 29—149.5 |
| 2,640,746 | 6/1953 | Phillips et al. | 277—223 X |

FOREIGN PATENTS

| | | |
|---|---|---|
| 756,150 | 8/1956 | Great Britain. |
| 1,193,778 | 5/1959 | France. |

LAVERNE D. GEIGER, *Primary Examiner.*

SAMUEL ROTHBERG, *Examiner.*

L. RANEY, J. MEDNICK, *Assistant Examiners.*